(12) United States Patent
Royall

(10) Patent No.: US 9,085,447 B1
(45) Date of Patent: Jul. 21, 2015

(54) CHILD SEAT SHOULDER HARNESS INSTALLATION GUIDE

(76) Inventor: Diane Royall, Sequim, WA (US)

( * ) Notice: Subject to any disclaimer, the term of this patent is extended or adjusted under 35 U.S.C. 154(b) by 443 days.

(21) Appl. No.: 13/552,910

(22) Filed: Jul. 19, 2012

Related U.S. Application Data

(60) Provisional application No. 61/509,772, filed on Jul. 20, 2011.

(51) Int. Cl.
*B25J 1/04* (2006.01)
*B66F 19/00* (2006.01)

(52) U.S. Cl.
CPC ... *B66F 19/00* (2013.01); *B25J 1/04* (2013.01)

(58) Field of Classification Search
USPC ............ 294/219, 3.6, 9, 10, 12, 24, 26, 27.1, 294/145; D7/669; 81/3.57; 29/278
See application file for complete search history.

(56) References Cited

U.S. PATENT DOCUMENTS

| | | | | |
|---|---|---|---|---|
| 3,819,221 | A * | 6/1974 | O'Connor | 81/484 |
| D256,655 | S * | 9/1980 | Lacey | D7/688 |
| D267,620 | S * | 1/1983 | Efron | D7/669 |
| 4,801,166 | A * | 1/1989 | Jordan et al. | 294/9 |
| 5,156,426 | A * | 10/1992 | Graves | 294/219 |
| 5,197,176 | A * | 3/1993 | Reese | 29/278 |
| 5,347,439 | A * | 9/1994 | Warren | 362/190 |
| 5,454,611 | A * | 10/1995 | Wanat | 294/24 |
| 5,496,083 | A * | 3/1996 | Shouse, Jr. | 294/211 |
| 5,620,231 | A * | 4/1997 | Marker et al. | 297/250.1 |
| D384,255 | S * | 9/1997 | Beckner | D8/16 |
| 6,430,797 | B1 * | 8/2002 | Dittmar et al. | 29/278 |
| 6,623,056 | B1 * | 9/2003 | Wickson | 294/158 |

* cited by examiner

*Primary Examiner* — Dean Kramer

(57) ABSTRACT

A device for temporary, directed movement of a shoulder harness for installing a child car seat on a vehicle seat, the device having a handle end and a generally triangular-shaped harness end with rectangular slot openings and entry openings shaped for slidable insertion and retention of seat belt strap material. In operation, a user slidably inserts a shoulder belt inside one of the slot openings and passes the device into, through, and out of, the back rest of a child car seat without requiring insertion of the user's hand inside the back rest.

1 Claim, 2 Drawing Sheets

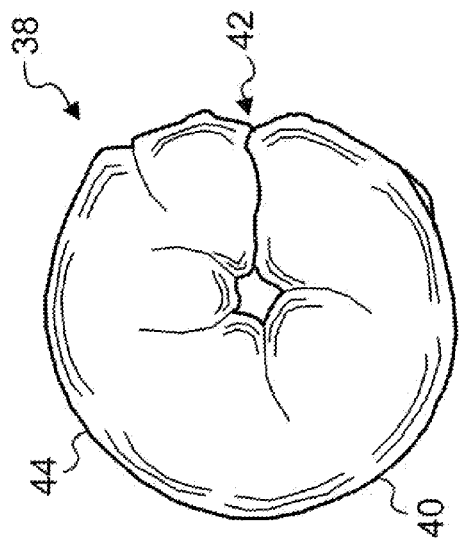
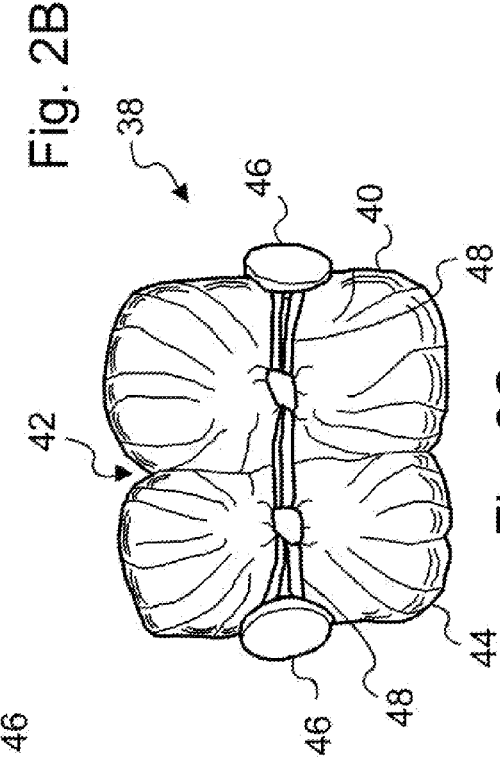
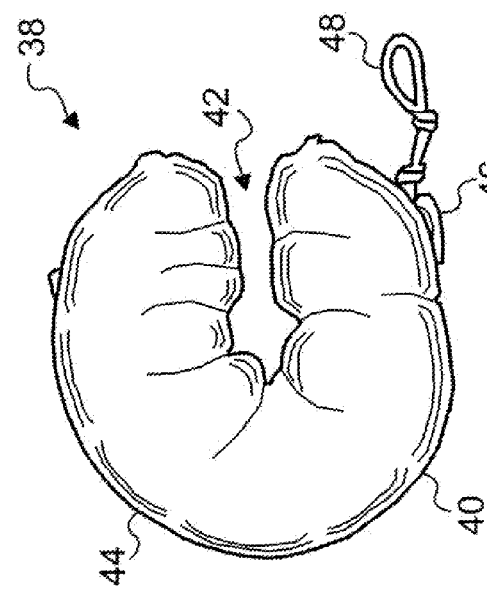
Fig. 2A
Fig. 2B
Fig. 2C

CHILD SEAT SHOULDER HARNESS INSTALLATION GUIDE

CROSS REFERENCE TO RELATED APPLICATIONS

This application claims priority under 35 USC 119(e) of Provisional Patent Application Ser. No. 61/509,772 filed Jul. 20, 2011, entitled "Child Seat Shoulder Harness Installation Guide" which is hereby incorporated by reference in its entirety.

FIELD OF THE INVENTION

The invention relates generally to belt guides, and particularly, to a device for temporary, directed movement of a shoulder harness for installing a child car seat on a regular vehicle seat without insertion of the installer's hand(s) inside the child car seat.

BACKGROUND OF THE INVENTION

Child seats are typically required to be mounted onto a regular vehicle seat and retained in position by the shoulder harness seatbelt. The shoulder harness seatbelt is threaded through slot openings in the back rest of the child seat and attached to the corresponding buckle. The child is then retained within the child seat with straps and buckles integral to the child seat itself. As a result, the vehicle's shoulder harness is the key mechanism that retains the child seat in position in the event of a car accident. Child seats are required by law in all states and must be used until the child reaches a certain age and/or weight that is deemed safe for use of the regular shoulder harness.

Installing a child seat is a time-consuming, unwieldy and unpleasant task. Most of the difficulty is associated with strapping the child seat in place via the vehicle's shoulder harness. To install a child seat within the regular seat of a vehicle, the installer must follow steps comprising: 1) setting the child seat on the vehicle seat with the back rest of the child seat resting against the back rest of the vehicle seat; 2) grasping the shoulder harness latch plate with a first hand; 3) while maintaining the grasp on the latch plate, inserting the latch plate within a first slot opening in the child seat back rest; 4) while continuing to maintain the grasp on the latch plate, leaning into the vehicle and reaching around the child seat with the second hand; 5) while still continuing to maintain the grasp on the latch plate, inserting the second hand inside an opposed slot opening in the back rest of the child seat; 6) reaching inside the opposed slot opening with the second hand until the second hand contacts the latch plate; 7) grasping the latch plate with the second hand while releasing the latch plate with the first hand without dropping the latch plate; 8) pulling the latch plate through the anterior space and outside the child seat; 9) inserting the latch plate into the car seat buckle. All of the above steps must be done slowly and without jerky movements to avoid triggering any Emergency Locking Retractors in the shoulder harness assembly.

The process is made even more difficult in instances involving: 1) large hands, whereby the insertion of the hands into the slot openings is extremely difficult, if not impossible; 2) the presence of sharp-edged plastic margins inside the anterior space of the back rest that can cause unpleasant scratches and scrapes on one or both of the installer's hands or arms; and/or, 3) a lack of anterior space in the back rest in instances in which the child already has sat down in the child seat, is leaning against the back rest, and is compressing the back rest.

In addition, the process of installing the child seat must be repeated every time the child seat is moved between vehicles or to other locations within a vehicle. Children also become attached to a particular child seat and want the same child seat regardless of vehicle used. As a result, the care giver is regularly, and sometimes on a daily basis, moving the child seat in and around between various vehicles.

Due to the multiple difficulties in installing child seats and the frequency of having to move the child seat, it is not uncommon for one or more of the child's caregivers to altogether fail to secure the seat with the shoulder harness, thereby rendering the child seat useless in a collision or accident. The danger to the child is extreme.

Accordingly, there is an unmet need in the art for a device to ease installation of child seats to prevent the uncomfortable, unwieldy and deterring series of steps as described above, to allow persons of all hand sizes to effectively and efficiently install the child seat, to prevent discomfort or injury to the installer's hands from contact with sharp edged plastic margins, and to permit installation of both empty seats and occupied seats for maximum use and protection to the child.

THE INVENTION

Summary of the Invention

The invention comprises a device for temporary, directed movement of a shoulder harness through the back rest of a child seat, comprising: 1) a unitary member of a uniform diameter having a handle end, a harness end, a vertical axis, a horizontal axis, and a continuous peripheral edge defining a top edge margin, a base edge margin, a distal end margin and a proximate end margin; 2) a first harness slot opening formed within the member proximate the distal end margin generally parallel with the vertical axis; 3) a second harness slot opening formed within the member along the base edge margin generally parallel with the horizontal axis; 4) a harness entry opening formed within the distal end margin defined by a pair of opposed spaced arms extending along the vertical axis generally parallel to the first harness slot opening; 5) a harness entry opening formed within the base edge margin defined by a pair of opposed spaced arms extending along the horizontal axis generally parallel to the second harness slot opening; and, 6) a plurality of curved spaced recesses formed within the base edge margin.

In operation, for a right-handed person, the right hand of the installer grasps the handle end of the guide, while the left hand of the installer grasps a shoulder belt for the vehicle's seat proximate a latch plate. The installer slides the shoulder belt material through an entry opening and into one of the slot openings. The installer next slidably inserts and pushes the harness end of the guide into the closest slot opening on the child seat. As the guide is inserted into and through the back rest of the child seat, the shoulder belt and lap belt are correspondingly extended inside the child seat. Once the guide is fully inserted within the back rest of the child seat, the installer reaches with his/her left hand to the opposed side opening of the back rest, grasps the harness end of the guide and pulls the guide out of the back rest. The installer then grasps the latch plate and inserts it into the corresponding seat belt buckle. The guide may be removed from the shoulder belt after exiting the back rest and stored in a convenient location within the vehicle.

BRIEF DESCRIPTION OF THE DRAWINGS

The invention is described in more detail with reference to the attached drawings, in which.

DETAILED DESCRIPTION

Figure 1:
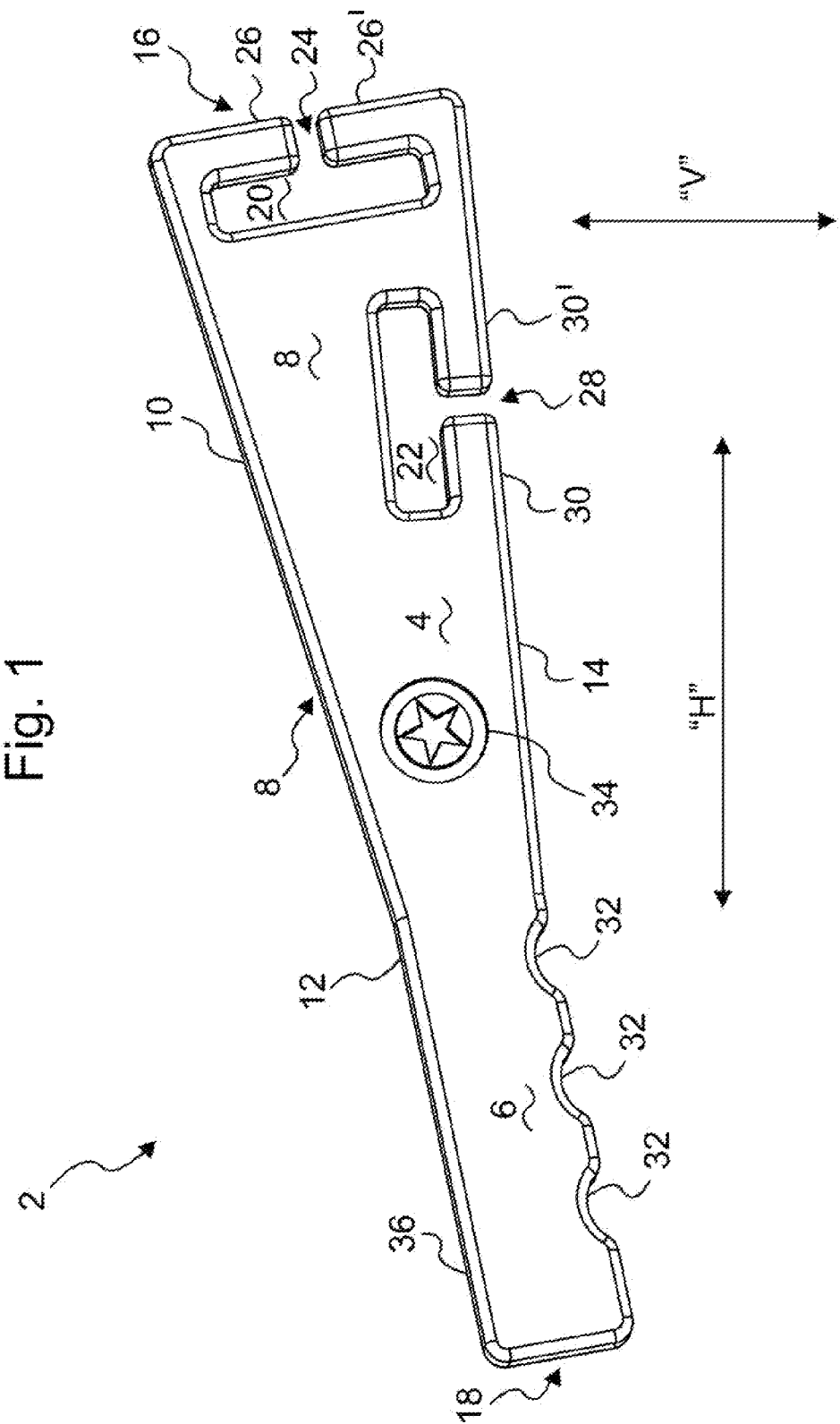
FIG. 1 is a front plan view diagram of an exemplary Child Seat Shoulder Harness Installation Guide, according to the invention; and, FIGS. 2A through 2C are side and front view photographs of an exemplary optional accessory that retains the buckle in a generally vertical, upright, easily-accessible position for insertion of the latch plate.

The following detailed description illustrates the invention by way of example, not by way of limitation of the scope, equivalents or principles of the invention. This description describes several embodiments, adaptations, variations, alternatives and uses of the invention.

In this regard, the invention is illustrated in the several figures, and is of sufficient complexity that the many parts, interrelationships, and sub-combinations thereof cannot be fully illustrated in a single patent-type drawing. For clarity and conciseness, several of the drawings show in schematic, or omit, parts that are not essential in that drawing to a description of a particular feature, aspect or principle of the invention being disclosed.

A. Child Seat Shoulder Harness Installation Guide

FIG. 1 shows an exemplary Child Seat Shoulder Harness Installation Guide ("guide") 2. As shown in FIG. 1, the guide 2 comprises a unitary member 4 of a uniform diameter having a handle end 6, a harness end 8, a vertical axis ("V"), a horizontal axis ("H"), and a continuous peripheral edge 10. The edge 10 defines a top edge margin 12, a base edge margin 14, a distal end margin 16 and a proximate end margin 18. A first harness slot opening 20 is formed within the member 4 proximate the distal end margin 16 generally parallel with the vertical axis "V". A second harness slot opening 22 is formed within the member 4 along the base edge margin 14 generally parallel with the horizontal axis "H". A first harness entry opening 24 formed within the distal end margin 16 is defined by a pair of opposed spaced arms 26/26' extending along the vertical axis "V" generally parallel to the first harness slot opening 20. A second harness entry opening 28 formed within the base edge margin 14 is defined by a pair of opposed spaced arms 30/30' extending along the horizontal axis "H" generally parallel to the second harness slot opening 22. A plurality of curved spaced recesses 32 are formed within the base edge margin 14. The top edge margin 12 is generally tapered along the horizontal axis "H" between the distal end margin 16 and the proximate end margin 18. The base edge margin 14 is generally straight along the horizontal axis "H".

As shown in FIG. 1, graphic information, including without limitation, a logo design and/or other trademark 34, may be printed and/or embossed on the member 4 at any suitable or desired locations. The designs or other trademarks 34 may be visible on the guide 2 through printed words, printed designs, embossed words and/or embossed designs.

As shown in FIG. 1, the first arms 26/26' are narrow extensions extending along the distal end margin 16 of the guide 2. The second arms 30/30' are narrow extensions extending along the base end margin 14. The two pairs of arms 26/26' and 30/30' approach each other but do not touch, thereby defining the entry openings 24/28. The arms 26/26' and 30/30' may be of equal lengths as shown in FIG. 1, or one may be of differing lengths, such as where the first arm 26 is shorter in length than the second arm 26'. It should be further understood that while FIG. 1 shows two slot openings 20/22, any suitable or desired number or shape of slot openings 20/22 may be utilized, such as a single slot opening of an oval shape, or additional slot openings in the member 4 to decrease the overall weight of the guide 2.

As shown in FIG. 1, the guide 2 further comprises a handle end 6 with a series of spaced recessions 32 formed in the base edge margin 14 for gripping the guide 2. The recesses 32 comprise three spaced curved indentations. While the guide 2 shown in FIG. 1 has three recesses 32 formed in the base edge margin 14, it should be understood that any suitable or desired number or location of recesses 32 may be utilized for enhanced gripping by a user's hand and/or fingers, including one or more recesses formed within the top edge margin 12.

Referring to FIG. 1, the guide 2 may further have all or portions of its peripheral edge 10 beveled 36, including at one or more of the top edge margin 12, the base edge margin 14, the distal end margin 16, the proximate end margin 18, the first harness slot opening 20, the second harness slot opening 22, and the recesses 32.

Referring to FIG. 1, exemplary size dimensions for the guide 2 are as follows: 15 inches in overall length along the horizontal axis "H"; a maximum width of 3 inches along the vertical axis "V", and a uniform width of 0.25 inches. The slot openings 20/22 are generally rectangular in shape and are approximately 2 inches by 0.5 inches. The slot openings 20/22 are shaped for slidable retention of a harness strap material. It should be understood that any suitable or desired length, width and depth dimensions of slot openings 20/22 may be utilized.

The guide 2 as shown in FIG. 1 may be constructed from any suitable or desired materials, or combinations thereof, including without limitation: plastics, rubber, wood, bamboo, aluminum, plastic coated papers, and/or composites. The material(s) utilized must be both sufficiently rigid and pliant for the purpose and method disclosed below.

FIGS. 2A through 2C show an optional C-shaped buckle support accessory 38 intended to retain a seat belt buckle (not shown) in an upright, easily-accessible position for insertion of a latch plate (not shown). The accessory 38 comprises a tubular cross sectional portion of foam 40 with a single opening 42 forming a C-shaped support 38 when viewed from the top in an open position. The foam 40 is enclosed within pliable material 44, the ends of said material 44 sewn closed at the end margins. Buttons 46 are attached to the opposed side margins proximate the opening 42 of the accessory 38.

To close the support 38 around a buckle strap (not shown), the buckle strap is inserted within the support 38; opposed ends of an elasticized loop 48 are wrapped around the base of the opposed buttons 46. When installed, the support 38 lifts and retains the belt portion of the buckle, thereby supporting the buckle in a generally vertically-oriented position. The guide 2 shown in FIG. 1 is used to guide a shoulder harness to a location proximate a seat belt buckle retained in a generally vertical position by the C-shaped buckle support 38 shown in FIG. 2.

B. Method of Use and Operation

In general, the guide 2 is used to retain a shoulder harness as it is slidably inserted and passed through the slot openings formed in the back rest of a child seat. Once the guide 2 exits the back rest, the installer can easily grasp the shoulder harness and complete installation by inserting the latch plate into the corresponding buckle. For purposes of this description, that portion of the shoulder harness that would otherwise rest against an occupant's shoulder will be referred to as the "shoulder belt," and that portion of the shoulder harness that would otherwise rest against an occupant's lap will be referred to as the "lap belt." The clasp that joins the shoulder belt to the lap belt is referred to as the "latch plate."

Referring to FIG. 1, in operation for a right-handed person, the right hand of the installer grasps the handle end 6 of the guide 2, while the left hand of the installer grasps the shoulder belt for the vehicle's seat proximate the latch plate. The installer slides the shoulder belt material through one of the entry openings 24/28 and into the corresponding slot opening 20/22. When this step is completed, the installer is left holding the handle end 6 with the right hand while the shoulder belt is retained within the slot opening 20/22.

While maintaining the grasp on the handle end 6, the installer next slidably inserts and pushes the harness end 8 of the guide 2 into the closest slot opening on the child seat. As the guide 2 is inserted into and through the back rest of the child seat, the shoulder belt and lap belt are correspondingly extended inside the child seat. However, the installer's right hand, still retaining the handle end 6, does not enter the back rest.

Once the guide 2 is fully inserted within the back rest of the child seat, the installer reaches with his/her left hand to the opposed side opening of the back rest, grasps the harness end 8 of the guide 2 and pulls the guide 2 out of the back rest. The installer then grasps the latch plate and inserts it into the corresponding seat belt buckle. The guide 2 may be removed from the shoulder belt after the guide 2 exits the back rest and stored in a convenient location, such as inside a pocket behind the front driver or passenger seats.

Alternately, the guide 2 may be flipped before insertion within the back rest so that the handle end 6 emerges first, with the user reaching around the child seat and grasping the handle end 6 to pull the shoulder harness through and out of the back rest.

The guide 2 disclosed herein provides for ease of installation of child seats by preventing the uncomfortable and unwieldy requirement of inserting the user's hands and arms into and through the back rest portion of the child seat. The guide 2 allows persons of all hand sizes to effectively and efficiently install the child seat, it prevents discomfort or injury to the installer's hands and arms from contact against sharp edged plastic margins within the child seat, and permits installation of both empty and occupied seats. The guide 2 promotes maximum use of the shoulder harness to secure the child seat within the vehicle, and thereby maximizes protection to the child occupying the seat.

I claim:

1. A hand-held device for temporary, directed movement of a shoulder harness, comprising:

a unitary member of a uniform thickness having a handle end, a harness end, a vertical axis, a horizontal axis, and a continuous peripheral edge defining a top edge margin, a base edge margin, a distal end margin and a proximate end margin;

a first harness slot opening generally rectangular in shape formed within the member proximate the distal end margin generally parallel with the vertical axis;

a second harness slot opening generally rectangular in shape formed within the member along the base edge margin generally parallel with the horizontal axis;

a harness entry opening formed within the distal end margin defined by a pair of opposed spaced arms extending along the vertical axis generally parallel to the first harness slot opening;

a harness entry opening formed within the base edge margin defined by a pair of opposed spaced arms extending along the horizontal axis generally parallel to the second harness slot opening; and a plurality of curved spaced recesses formed within the base edge margin;

wherein at least one of the top edge margin, the base edge margin, the distal edge margin, the proximate end margin, the first harness slot opening, the second harness slot opening, and the recesses are defined by at least one beveled edge;

wherein the top edge margin is generally tapered along the horizontal axis between the distal end margin and the proximate end margin.

\* \* \* \* \*